(12) United States Patent
Hoepken

(10) Patent No.: US 6,366,532 B1
(45) Date of Patent: Apr. 2, 2002

(54) APPARATUS FOR DETECTING POSITION

(75) Inventor: Hermann Hoepken, Sprockhovel (DE)

(73) Assignee: K.A. Schmersal GmbH & Co. (DE)

( * ) Notice: Subject to any disclaimer, the term of this patent is extended or adjusted under 35 U.S.C. 154(b) by 0 days.

(21) Appl. No.: 09/489,953

(22) Filed: Jan. 24, 2000

(30) Foreign Application Priority Data

Jan. 29, 1999 (DE) .......................................... 199 03 644

(51) Int. Cl.⁷ .............................. G01S 11/14; B66B 1/34
(52) U.S. Cl. ........................ 367/127; 367/120; 367/124; 187/394
(58) Field of Search ................................ 367/118, 120, 367/124, 127; 187/394; 324/207.12

(56) References Cited

U.S. PATENT DOCUMENTS

| | | |
|---|---|---|
| 3,696,328 A | 10/1972 | Schwartz |
| 4,012,588 A | 3/1977 | Davis et al. |
| 4,035,762 A | 7/1977 | Chamuel |
| 4,041,495 A | 8/1977 | Martin |
| 4,233,588 A | 11/1980 | Satoh |
| 4,238,844 A | 12/1980 | Ueda et al. |
| 4,375,057 A | 2/1983 | Weise et al. |

(List continued on next page.)

FOREIGN PATENT DOCUMENTS

| | | |
|---|---|---|
| DE | 965 203 | 6/1957 |
| DE | 2610127 | 9/1977 |
| DE | 3608384 | 2/1989 |
| DE | 4229079 | 3/1994 |
| EP | 0694792 A1 * | 5/1996 |
| EP | 0694792 | 1/1999 |
| GB | 2 211 046 A | 6/1989 |
| JP | 58156872 | 9/1983 |
| JP | 60218087 | 10/1985 |

OTHER PUBLICATIONS

European Search Report, Apr. 26, 2000, Application No. EP 00 10 0973.
European Search Report, Apr. 26, 2000, Application No. EP 00 10 0975.
European Search Report, Apr. 26, 2000, Application No. EP 00 10 0976.
European Search Report, Apr. 26, 2000, Application No. EP 00 10 0974.

*Primary Examiner*—Ian J. Lobo
(74) *Attorney, Agent, or Firm*—Patterson, Thuente, Skaar & Christensen, P.A.

(57) ABSTRACT

The invention relates to an apparatus for detecting the position of an object moveable along a predetermined travel path, comprising:
  an acoustic signal waveguide extending along the travel path and having a predetermined, uniform speed of propagation of sound;
  a signal input coupler located on the moveable object, to couple a clocked acoustic signal into the acoustic signal waveguide,
  signal output couplers at both ends of the acoustic signal waveguide and each being connected to an evaluation unit for determining the propagation-time difference of the sound signal from a position at which it is coupled in to the signal output couplers and for generating a signal representative of the instantaneous position of the moveable object on the travel path,
  wherein a calibration signal input coupler connected to a calibration acoustic signal generator for a calibration acoustic signal is provided on one of the signal output couplers, the evaluation unit calculating a correction variable for subsequent determinations of position from the calibration path passed through by the calibration acoustic signal to the other signal output coupler and the propagation time of the calibration acoustic signal over the calibration path.

16 Claims, 2 Drawing Sheets

U.S. PATENT DOCUMENTS

| | | |
|---|---|---|
| 4,389,631 A | 6/1983 | Kajiyama et al. |
| 4,392,214 A | 7/1983 | Marini et al. |
| 4,494,224 A | 1/1985 | Morrell et al. |
| 4,606,015 A | 8/1986 | Yamaguchi |
| 5,223,680 A | 6/1993 | Schmidt-Milkau et al. |
| 5,306,882 A | 4/1994 | Gerwing et al. |
| 5,406,200 A | 4/1995 | Begin et al. |
| 5,509,505 A | 4/1996 | Steger et al. |
| 5,736,695 A * | 4/1998 | Hoepken .................. 187/394 |
| 5,883,345 A | 3/1999 | Schönauer et al. |

* cited by examiner

APPARATUS FOR DETECTING POSITION

FIELD OF THE INVENTION

The invention relates to an apparatus for detecting the position of an object which can move along a predefined path. Such apparatus may be used for controlling the position of a lift cage or the like and thus ensuring its positioning at predetermined stops according to floor levels.

BACKGROUND OF THE INVENTION

European patent 0 694 792 discloses an apparatus of this type for detecting the position of a movable object, which has an acoustic signal waveguide which extends along a travel path and has a predetermined, uniform speed of propagation of sound, and has a signal input coupler, which is connected to a signal generator and is located on the movable object, to couple an acoustic signal into the acoustic signal waveguide. In this case, signal output couplers are arranged at both ends of the acoustic signal waveguide and are each connected to a counter, the two counters being clocked by a clock generator and connected to a subtracter for the output signals from the two counters. The output signal from the subtracter, as a measure of the propagation-time difference of the acoustic signal coupled in from the point at which it is coupled in to the signal output couplers, can be processed by an evaluation unit to form a signal which is representative of the instantaneous position of the movable object on the travel path, the signal input coupler operating with a signal spacing which is greater than the propagation time of sound from one end of the travel path to the other.

By means of the evaluation unit and a computing algorithm implemented in it, the measured propagation times from the sound input coupler to the sound output couplers are assigned a position value. Particularly in lift construction, the evaluation unit is calibrated by the flush level point of each story being assigned the result of the computing algorithm at this point, and the lift position being associated with this numerical value. Because of temperature-induced changes in the building and/or acoustic signal waveguide length, or as a result of a change in the speed of sound in the acoustic signal waveguide arising from temperature and diffusion effects, however, the assignment between the flush level point and the numerical value associated by the calibration is shifted.

German patent 3 608 384 further discloses the principle, in measuring distance travelled by means of determining the propagation time of acoustic pulses, to provide a calibration section alongside the measurement section, in order to be able to convert the propagation-time measurement results into a travel length which is as accurate as possible. However, in this case the measurement and calibration sections are physically separated from each other, in order that the actual measurement can be carried out simultaneously with the calibration measurement.

SUMMARY OF THE INVENTION

It is an object of the invention to provide a apparatus for detecting the position of an object which can be moved along a prescribed path, with which it is possible to move simply and accurately to predetermined positions of the movable object on a travel path of great lengths.

Further objects, embodiments and advantages of the invention will become apparent from the following description and the claims.

An apparatus for detecting the position of an object moveable along a predetermined travel path in accordance with the present invention comprises an acoustic signal waveguide extending along the travel path and having a predetermined, uniform speed of propagation of sound;

a signal input coupler located on the moveable object, to couple a clocked acoustic signal into the acoustic signal waveguide, signal output couplers at both ends of the acoustic signal waveguide and each being connected to an evaluation unit for determining the propagation-time difference of the sound signal from a position at which it is coupled in to the signal output couplers and for generating a signal representative of the instantaneous position of the moveable object on the travel path, wherein a calibration signal input coupler connected to a calibration acoustic signal generator for a calibration acoustic signal is provided on one of the signal output couplers, the evaluation unit calculating a correction variable for subsequent determinations of position from the calibration path passed through by the calibration acoustic signal to the other signal output coupler and the propagation time of the calibration acoustic signal over the calibration path.

BRIEF DESCRIPTION OF THE DRAWINGS

The invention will be explained in more detail below with reference to a preferred embodiment illustrated schematically in the appended drawings.

DETAILED DESCRIPTION OF THE PREFERRED EMBODIMENT

Figure 1:
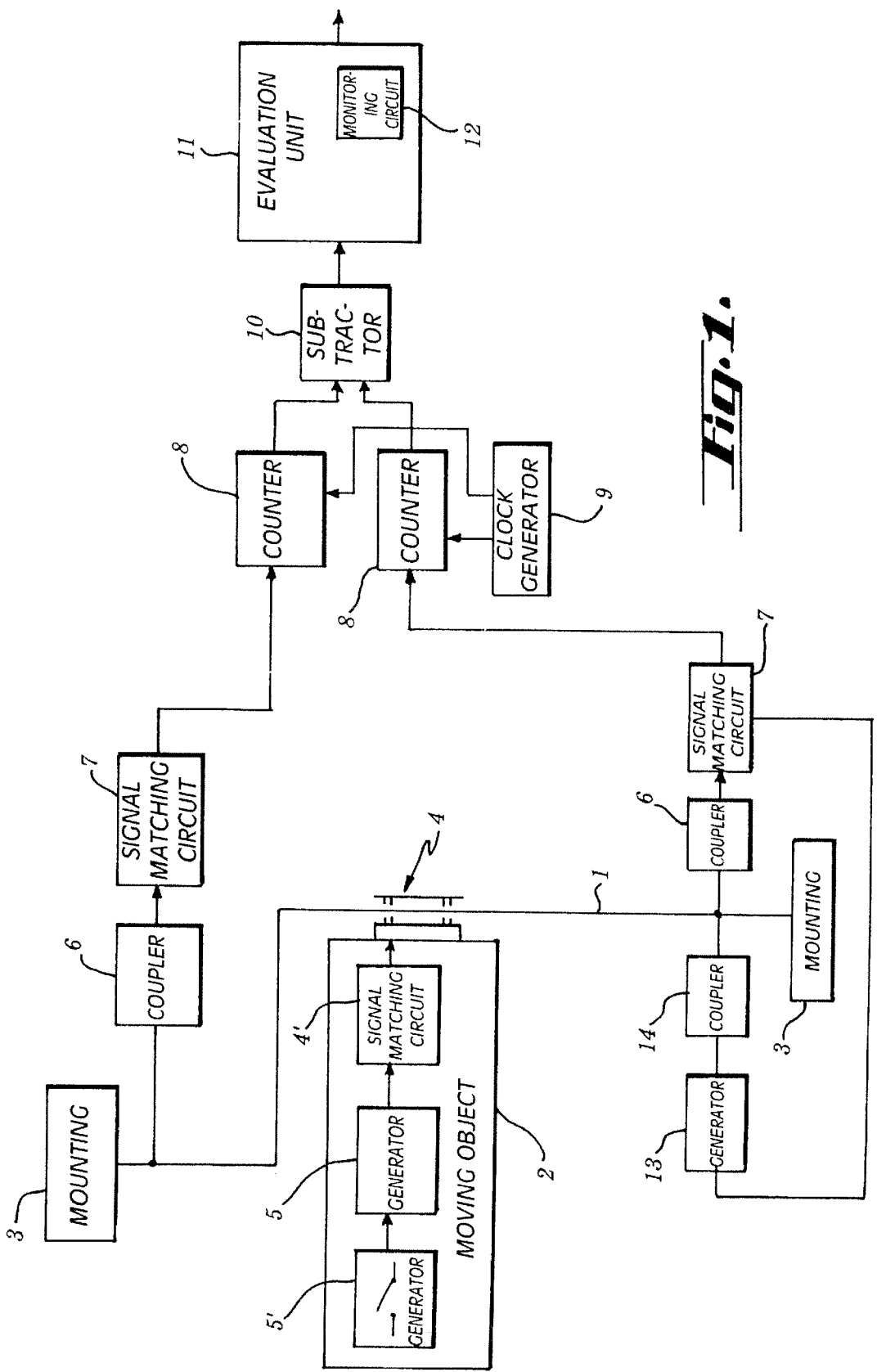
FIG. 1 shows an apparatus for detecting position according to the invention in schematic form.

The apparatus shown for detecting position, which can be used in particular for detecting the position of a lift cage, comprises an acoustic signal waveguide 1, for example a steel rail or in particular a wire, which extends along a prescribed travel path, along which a movable object 2, for example a lift cage, can be moved to and from. The acoustic signal waveguide 1 having a predetermined, uniform speed of propagation of sound, is clamped or held in a damped manner at both ends in a damping clamp or mounting 3.

The movable object 2 carries a signal input coupler 4 which is connected to a signal generator 5, for example an oscillator, via a signal matching circuit 4'. The signal input coupler 4, which in particular operates inductively, couples an acoustic signal, which periodically includes a synchronization pulse S received from the signal generator 5, into the acoustic signal waveguide 1. The synchronization pulses S have a clock period greater than the duration of the propagation of the acoustic signal from one end of the acoustic signal waveguide 1 to the other.

In addition, the signal input coupler 4 couples in additional pulses M, specifically a large number of additional pulses M during each clock period of the synchronization pulses S. The clock period of the additional pulses M is such that a distance resolution, needed for example for braking and for moving to an exact position of the object 2, is achieved in the direction of the travel path.

Figure 2:
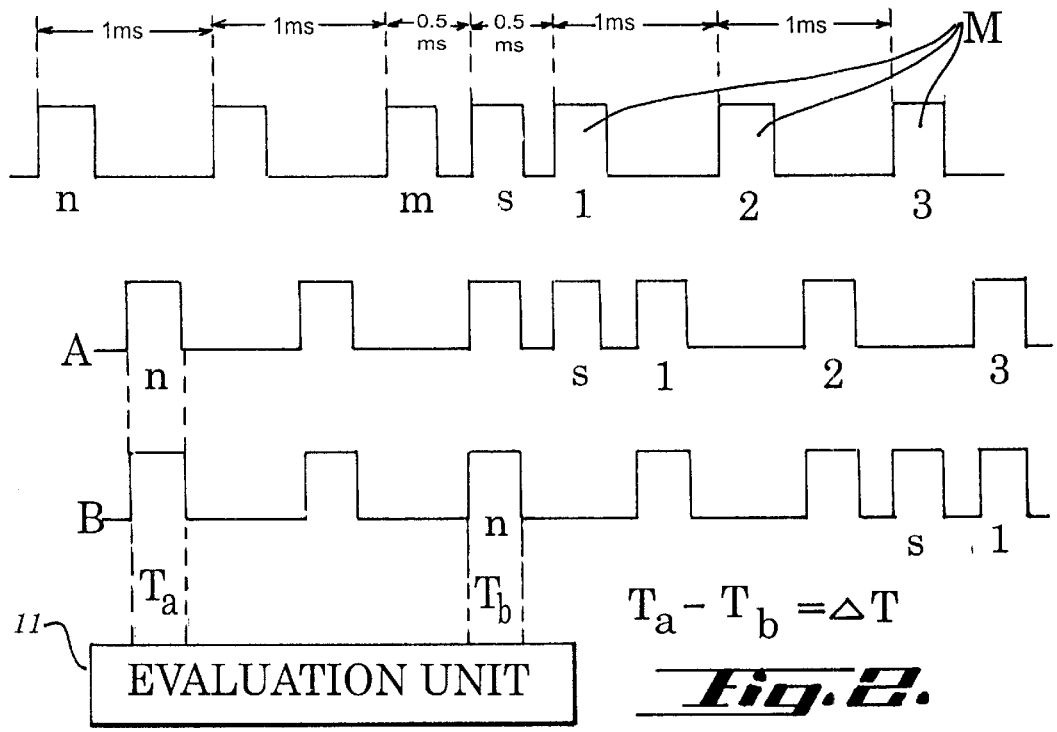
FIG. 2 shows a timing diagram relating to the signals of the apparatus of FIG. 1 in travelling operation.

The synchronization pulses S are marked, that is to say can be distinguished from the additional pulses M during the evaluation. The marking can be made, for example, by their clock period being an appropriate multiple of the clock period of the additional pulses M, and additionally by their offset in time in relation to the additional pulses M, for example by one half clock period, cf. the pulse train generated by the signal generator 5 in the first line of FIG. 2. Then, a predetermined number of m additional pulses M follows a synchronization pulse S in each case.

However, the marking can also be made in another way, thus the synchronization pulses S can be distinguished from the additional pulses M by modulation, pulse width, pulse height or the like.

The synchronization and additional pulses S, M to be coupled in may be short electromagnetic pulses, for example simple pulses, or pulse trains, or periodic frequency shift keying.

A signal output coupler 6 is arranged in each case at the ends of the acoustic signal waveguide 1. This is preferably a piezoelectric signal output coupler 6, however those operating inductively or capacitively can also be used.

Each signal output coupler 6 is connected to a signal matching circuit 7 whose output lines in each case lead to a counter 8. Both the counters 8 are clocked by a clock generator 9, an oscillator. The clock time of the clock generator 9 is considerably lower than the propagation time of the sound from one end of the acoustic signal waveguide 1 to the other and is selected in accordance with the desired measurement path resolution. The outputs from the counters 8 are fed to a subtracter 10, which forms the difference of the output signals of the counters 8 and feeds it to an evaluation unit 11, for example a microprocessor, where the output signal from the subtracter 10 is evaluated.

The synchronization pulses S are used to indicate to the evaluation unit 11 which following pairs of additional pulses belong to each other, namely the respective nth, that is to say first, second, third and so on, additional pulses M arriving at the two signal output couplers 6 (designated by A and B in FIG. 2) at different times $T_a$ and $T_b$, following the respective synchronization pulse S, in order that the evaluation unit 11 can detect or determine the associated absolute time difference $T_a-T_b=\Delta T$ between associated additional pulses M, and hence the position of the object 2.

The evaluation in order to detect the position is primarily carried out in relation to the additional signals M, however the synchronization pulses S can also be evaluated in this regard, specifically above all but not exclusively when the respective mth additional pulse is specially marked, in order in this way to serve as a synchronization pulse S.

If the movable object 2 is located in the centre between the signal output couplers 6, the outputs from the counters 8 are equal and their difference is zero. If the object 2 (in the case of a vertical path) is located above the centre, the output from the counter 8 which is connected to the upper signal output coupler 6 is smaller than that of the other. From the propagation time difference of the additional pulses M belonging together in the acoustic signal waveguide 1, determined by the subtracter 10, and the known sound speed in the latter, there results the distance of the movable object 2 from the centre. Since the difference would have a different sign if the movable object 2 were to be located below the centre, it is also known whether the movable object 2 is located above or below the centre, that is to say the exact position of the movable object 2 can thus be calculated. A digital or analog position signal which can be generated by the evaluation unit 11 can be used for tracking control.

A monitoring circuit 12 (watchdog) of the evaluation unit 11 can be used for the simple monitoring of the measurement path in the case of an input coupling which is constant over time of the input coupling signal. In the case of a contamination which is capable of damping the signal on the acoustic signal waveguide 1, the difference determined by the subtracter 10 exceeds a predetermined value, to which the monitoring circuit 12 responds in order to trigger a corresponding alarm signal or the like.

For the purpose of calibration, a calibration signal input coupler 14 connected to a calibration acoustic signal generator 13 for outputting a calibration acoustic signal is integrated in the signal output coupler 6, and, during the period during which no determination of position is performed, that is to say the object 2 is at a standstill, is activated, for example having voltage applied to it, in order to perform a calibration. In the process, the calibration acoustic signal passes through the entire calibration path of known length between the two signal output couplers 6, and the evaluation unit 11 calculates a correction variable for subsequent determinations of position from the calibration path which the calibration acoustic signal has passed through to the other signal output coupler 6 and the propagation time of the calibration acoustic signal over the calibration path.

The corresponding signal output coupler 6 can also itself be set up as a calibration signal input coupler and may be capable of being coupled to the calibration acoustic signal generator 13.

Figure 3:
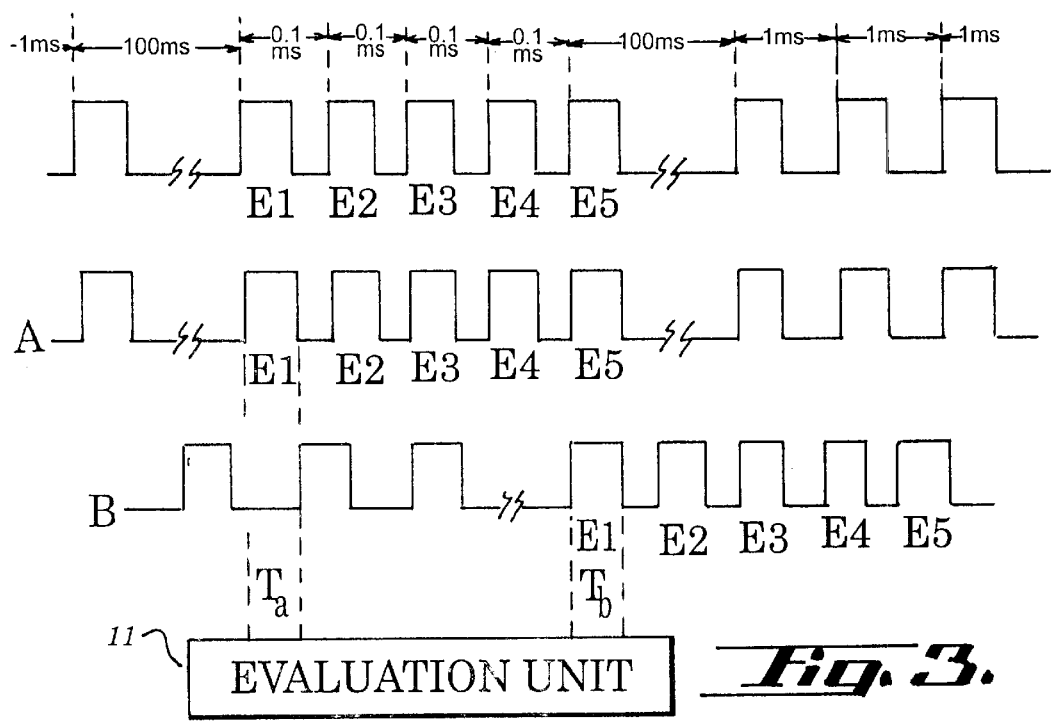
FIG. 3 shows a timing diagram relating to the signals from the apparatus of FIG. 1 during calibration.

As can be seen from FIG. 3, the signal flow, consisting of signals P (with an essentially constant dock period of, for example, 1 ms) from the signal input coupler 4 is interrupted for a predetermined time while the moving object 2 is at a standstill, while a series of calibration pulses E from the calibration acoustic signal generator 13 is coupled in. The latter can be done, for example, between two relatively long pauses of, for example, 100 ms, the calibration pulses E being, for example, a sequence of a number of short pulses which can have a clock period of, for example, 0.1 ms.

By means of each calibration cycle, the system is therefore readapted to the mechanical measurement path within its measurement resolution. As a result of the calibration, the linear errors such as occur as a result of the change in height of a building or as a result of a change to the speed of sound in the acoustic signal waveguide 1 arising from temperature and/or diffusion effects are compensated for to the real length of the measurement path. This makes it possible to use a simple acoustic signal waveguide in the form of a wire.

Synchronization between the signal output couplers 6, the control unit 11 and the calibration acoustic signal generator 13 is possible without any cabling. Only the movable object 2, for example the lift cage of a lift, has to be provided with a device for interrupting the coupling in of acoustic signals for position detection, for example a signal generator 5', which responds to the stopping of the object 2 or to the closing movement of the lift cage door or the like, in order to take the signal generator 5 or the signal input coupler 4 out of operation for a predetermined time, in order that collisions between measurement pulses and pulses for calibration do not occur. In the simplest embodiment, this device comprises an interrupter for the operating voltage of the signal generator 5 or the signal input coupler 4. If, then, the corresponding signal output coupler 6 does not receive any signal during a predetermined time which, for example, is somewhat greater than the clock period of the synchronization pulses S, the said coupler initiates the measurement cycle via appropriate circuits, in that voltage is applied to the calibration acoustic signal generator 13.

The speed of sound in an acoustic signal waveguide 1 made of steel is approximately 5300 m/s. In the case of a time resolution of 188 ns, for which a clock generator frequency of 5.3 MHz is necessary, the location resolution of the measurement path is about 1 mm.

Instead of being coupled to the signal generator 5, the signal input coupler 4 may be triggered by evaluation unit 11 to couple the acoustic signals into the signal waveguide 1. Instead it is also possible that the signal input coupler 4 triggers the evaluation unit 11 via an electric signal to define the temporal start of each coupling of an acoustic signal into the signal waveguide 1 for the evaluation to be done by the evaluation unit 11.

While the invention has been shown and described with reference to a preferred embodiment, it should be apparent to one of ordinary skill in the art that many changes and modifications may be made without departing from the spirit and scope of the invention as defined in the claims.

What is claimed is:

1. An apparatus for detecting the position of an object moveable along a predetermined travel path, comprising:

an acoustic signal waveguide extending along the travel path and having a predetermined, uniform speed of propagation of sound;

a signal input coupler located on the moveable object, to couple a clocked acoustic signal into the acoustic signal waveguide, signal output couplers at both ends of the acoustic signal waveguide and each being connected to an evaluation unit for determining the propagation-time difference of the sound signal from a position at which it is coupled in to the signal output couplers and for generating a signal representative of the instantaneous position of the moveable object on the travel path, wherein a calibration signal input coupler connected to a calibration acoustic signal generator for a calibration acoustic signal is provided on one of the signal output couplers, the evaluation unit calculating a correction variable for subsequent determinations of position from the calibration path passed through by the calibration acoustic signal to the other signal output coupler and the propagation time of the calibration acoustic signal over the calibration path.

2. The apparatus of claim 1, wherein the calibration acoustic signal generator and the calibration signal input coupler are integrated in one of the signal output couplers.

3. The apparatus of claim 1, wherein the movable object is provided with a device for starting up a calibration operation while the object is at a standstill.

4. The apparatus of claim 3, wherein the device for starting up a calibration operation has an interrupter for the operating voltage of the signal generator, and the signal output coupler connected to the calibration acoustic signal generator starts up the calibration acoustic signal generator after a predetermined time with no signals.

5. The apparatus of claim 3 or 4, wherein the device for starting up a calibration operation has an interrupter for the operating voltage of the signal input coupler, and the signal output coupler connected to the calibration acoustic signal generator starts up the calibration acoustic signal generator after a predetermined time with no signals.

6. The apparatus of claim 1, wherein the acoustic signal waveguide is a wire.

7. The apparatus of claim 1, wherein the signal input coupler couples in, as acoustic signal, syncronization pulses with a clock period which is greater than the time of propagation of sound from one end of the travel path to the other, and a large number of additional pulses in between.

8. The apparatus of claim 7, wherein the synchronization pulses are marked with respect to the additional pulses.

9. The apparatus of claim 8, wherein the clock of the synchronization pulses is offset in time with respect to that of the additional pulses.

10. The apparatus of claim 7, wherein the synchronization pulses and the additional pulses are fed to the evaluation unit to determine the propagation-time difference.

11. The apparatus of claim 1, wherein each of the signal output couplers is connected with a counter which are clocked by a clock generator, and are connected to a subtracter for the output signals from the two counters.

12. The apparatus of claim 11, wherein a clock generator for the counters operates at a minimum frequency which is needed for an envisaged measurement path resolution.

13. The apparatus of claim 1, wherein the signal output couplers are capacitive, inductive or in particular piezoelectric output couplers.

14. The apparatus of claim 11, wherein the evaluation unit includes a monitoring circuit which triggers an alarm signal if the difference determined by the subtracter exceeds a predetermined value.

15. The apparatus of claim 1, wherein the movable object is a lift cage.

16. Apparatus for detecting the position of an object which can be moved along a predefined travel path, having an acoustic signal waveguide extending along the travel path and having a predetermined, uniform speed of propagation of sound, and having a signal input coupler, which is connected to a signal generator and is located on the movable object, for coupling a clocked acoustic signal into the acoustic signal waveguide, signal output couplers being arranged at both ends of the acoustic signal waveguide and being connected in each case to a counter, the two counters being connected to an evaluation unit for determining the propagation-time difference of the sound signal coupled in from the point at which it is coupled in to the signal output couplers and for generating a signal that is representative of the instantaneous position of the movable object on the travel path, wherein a calibration signal input coupler connected to a calibration acoustic signal generator for a calibration acoustic signal is provided on one of the signal output couplers, the evaluation unit calculating a correction variable for subsequent determinations of position from the calibration path passed through by the calibration acoustic signal to the other signal output coupler and the propagation time of the calibration acoustic signal over the calibration path.

* * * * *